(12) United States Patent
Kenig

(10) Patent No.: US 10,550,269 B2
(45) Date of Patent: Feb. 4, 2020

(54) ANTI-CORROSIVE PAINTINGS AND COATINGS CONTAINING NANOPARTICLES

(75) Inventor: Shmuel Kenig, Haifa (IL)

(73) Assignee: Nanto Cleantech Inc., Pittsburgh, PA (US)

( * ) Notice: Subject to any disclaimer, the term of this patent is extended or adjusted under 35 U.S.C. 154(b) by 434 days.

(21) Appl. No.: 12/998,645

(22) PCT Filed: Dec. 7, 2009

(86) PCT No.: PCT/IT2009/000550
§ 371 (c)(1),
(2), (4) Date: Aug. 12, 2011

(87) PCT Pub. No.: WO2010/064274
PCT Pub. Date: Jun. 10, 2010

(65) Prior Publication Data
US 2011/0294918 A1 Dec. 1, 2011

(30) Foreign Application Priority Data
Dec. 5, 2008 (IT) .................. TV2008A0160

(51) Int. Cl.
| | | |
|---|---|---|
| C09D 5/08 | (2006.01) | |
| C08K 3/34 | (2006.01) | |
| C09D 7/61 | (2018.01) | |
| C09D 167/00 | (2006.01) | |
| C09D 167/08 | (2006.01) | |
| C09D 163/00 | (2006.01) | |
| C09D 175/04 | (2006.01) | |
| C09D 135/02 | (2006.01) | |
| B82Y 30/00 | (2011.01) | |
| C08K 7/00 | (2006.01) | |
| C08K 9/04 | (2006.01) | |
| C09D 7/40 | (2018.01) | |

(52) U.S. Cl.
CPC ............ *C09D 5/084* (2013.01); *C08K 3/346* (2013.01); *C09D 7/61* (2018.01); *C09D 7/70* (2018.01); *C09D 135/02* (2013.01); *C09D 163/00* (2013.01); *C09D 167/00* (2013.01); *C09D 167/08* (2013.01); *C09D 175/04* (2013.01); *C08K 9/04* (2013.01); *C08K 2201/011* (2013.01)

(58) Field of Classification Search
CPC .. C09D 163/00–10; C09D 5/084; C09D 7/61; C09D 7/70; C09D 167/00; C09D 167/08; C09D 175/04; C09D 135/02; C08K 3/346; C08K 2201/011; B82Y 30/00
See application file for complete search history.

(56) References Cited

U.S. PATENT DOCUMENTS

| | | | |
|---|---|---|---|
| 4,508,767 A * | 4/1985 | Hokamura et al. ........ | 427/407.1 |
| 5,554,670 A * | 9/1996 | Giannelis et al. ........... | 523/209 |
| 6,682,872 B2 * | 1/2004 | Sachdev et al. ............. | 430/311 |
| 6,878,767 B2 | 4/2005 | Kenig | |
| 7,303,797 B1 * | 12/2007 | Barsotti et al. ............. | 428/36.7 |
| 7,462,233 B2 | 12/2008 | Simpson et al. | |
| 7,479,324 B2 | 1/2009 | Bianchi et al. | |
| 2002/0028288 A1 * | 3/2002 | Rohrbaugh et al. ......... | 427/180 |
| 2002/0173559 A1 | 11/2002 | Kenig | |
| 2004/0231231 A1 * | 11/2004 | Cataldo et al. ............. | 43/132.1 |
| 2005/0070655 A1 * | 3/2005 | Van Den Bergen et al. ............... 524/445 |
| 2005/0137291 A1 | 6/2005 | Schneider | |
| 2006/0025505 A1 | 2/2006 | Hammond | |
| 2007/0072979 A1 * | 3/2007 | Moad et al. .................. | 524/445 |
| 2007/0232727 A1 * | 10/2007 | Lin et al. ..................... | 523/440 |
| 2010/0314585 A1 | 12/2010 | Fruge et al. | |
| 2013/0043423 A1 * | 2/2013 | Guschl ....................... | 252/62.54 |

FOREIGN PATENT DOCUMENTS

| | | | | |
|---|---|---|---|---|
| DE | 102006055919 | | 11/2006 | |
| EP | 267341 A1 * | | 5/1988 | ............... C08K 3/34 |
| WO | WO 03/018696 | | 3/2003 | |
| WO | WO03/080894 A | | 10/2003 | |
| WO | WO2005/059045 A1 | | 6/2005 | |
| WO | WO 2007055498 A1 * | | 5/2007 | ............... C09D 5/08 |

OTHER PUBLICATIONS

Cloisite 30B Typical Physical Properties (No date).*
Davood Zaarei et al., "Rheological Studies of Uncured Epoxy-Organoclay Nanocomposite Coatings," E-Polymers, No. 117 (Sep. 2008).*
Nanocor Literature T-11, Epoxy Nanocomposites Using Nanomer I.30E Nanoclay (2004).*
Dow Chemical, DEN 438 Technical Data Sheet (no date).*
Ghijsels et al., "Temperature dependence of the zero-shear melt viscosity of oligomeric epoxy resins," Polymer, vol. 25, 463-466 (1984).*
PCT Search Report dated Apr. 21, 2010.
Office Action for corresponding Canadian Appl. No. 2,743,597 dated Jun. 29, 2016.
Communication Intention to Grant for EP2352789A1 dated Aug. 31, 2016.
Thomas G. Mezger, "Das Rheologie Handbuch," Für Anwender von Rotations- and Oszillations-Rheometern, Hannover: Vincentz Network, (pp. 30,86,321,322,420), 2010.

(Continued)

*Primary Examiner* — Kregg T Brooks

(74) *Attorney, Agent, or Firm* — Myers Wolin, LLC

(57) ABSTRACT

The present invention refers to a formulation for anticorrosion paints and coatings, based on epoxy, polyurethane, acrylic, alkylic, polyester resins and mixtures thereof, dissolved in organic or inorganic solvent and comprising a multitude of mostly bi-dimensionally developed nanoparticles, with a few hundred and about one nanometer, respectively, as to lateral dimensions and thickness, wherein the viscosity of the formulation is lower than 55000 mPa·s.

10 Claims, No Drawings

(56) References Cited

OTHER PUBLICATIONS

Yeh, J., et al., "Siloxane-modified epoxy resin-clay nanocomposite coatings with advanced anticorrosive properties prepared by a solution dispersion approach", Surface and Coatings Technology 200 pp. 2753-2763, Jan. 25, 2005.
Overview of Dow Epoxy Resins, May 2006.
Wikipedia, Entry of Dimethylacetamide, last edited on Sep. 9, 2017.
K. Jasmund, G. Lagaly, Tonmineralien und Tone, Steinkopff Verlag, 1993, (p. 141).
A Goldschmidt et al., "Glasurit-Handbuch Lacke und Farben," 1984, (pp. 274-277, 492-494).

* cited by examiner

# ANTI-CORROSIVE PAINTINGS AND COATINGS CONTAINING NANOPARTICLES The present invention refers to nanoplatelet containing anticorrosion paints and coatings.

Particularly the present invention refers to anticorrosion paints and coatings containing nano particles consisting of inorganic aluminium-silicate having a platelet shape, in the following defined as nanoclays.

It is known that coating, painting and primer formulations are based on polymers containing solid particulates, pigments, plasticizing agents and others technological aids dissolved in organic solvents (organic based coatings) or water (water based coatings).

It is also known that, among currently commercially available anticorrosion paints and coatings, epoxy, polyurethane or acrylic paints and coatings display excellent adhesion and durability properties and, particularly, are extensively used to coat steel structures in order to retard the corrosion effects resulting from oxygen and humidity combination activity.

However, as a result of inherent composition thereof, these paints and coatings absorb humidity and do not represent an oxygen optimal barrier. The humidity absorption and oxygen passage are the reason for the corrosion process of coated metals, resulting in oxide formation at metal-coat interface. Such phenomenon is then followed by coating separation (debonding) and increasing degradation of metallic substrate.

In order to overcome these limitations of previously known paints and coatings, according to U.S. Pat. No. 6,878,767 a reduced permeability paint formulation has been disclosed, comprising a filmogen agent, a pigment and a multitude of chemically treated nano-particles having a platelet shape, that is mostly bi-dimensionally developed, with a few hundred and about one nanometer as to lateral dimensions and thickness, respectively. According to said patent, the percentage of platelets (preferably aluminium-silicate, in any case consisting of water-impermeable material) dispersed within the formulation is 1 to 10% by volume and the platelets are chemically treated with organic (like for example amino- or epoxy-terminated silane) or inorganic (like for example an aliphatic acid) compounds in order to facilitate their orientation according to parallel direction of substrate, the paint is applied on, thus increasing the platelets intermolecular forces. By arranging according to substrate surface parallel direction, the platelets reduce available passage spaces to corrosive liquid or gas molecules and increase the distance to be traveled in order to reach the coating layer and substrate interface, thus reducing the possibility of oxide formation on the interface and successive coat debonding.

On the other hand has been demonstrated that the formulations according to U.S. Pat. No. 6,878,767 do not allow an optimal platelet orientation, thus reducing the waterproofing effect the platelets are added for. By microscopic analysis, particularly Transmission Electron Microscopy (TEM), and permeation measurements it has been possible to verify that the order and the alignment at nanometer level of the nanoclays are disturbed due to the excessive formulation viscosity, resulting in a lower barrier effect to the humidity and oxygen and consequently an increased corrosion. This results from the fact that, because of their shape with a particularly extended surface in respect to thickness (high aspect ratio), the platelets added to paint polymeric resins are easily immobilized by polymer molecules.

In the light of above, it is apparent the need to provide a formulation for anticorrosion paints and coatings containing nanometric sized platelets overcoming the limitations of the formulations according to U.S. Pat. No. 6,878,767.

In this context it is offered the problem solution according to the present invention, aiming to provide a formulation for anticorrosion paints and coatings containing nanoclays, wherein said nanoclays are chemically treated and the viscosity is controlled in such way to favour the alignment of nanoclays parallel to the substrate the formulation is applied on.

The object of the present invention is therefore to provide a formulation for anticorrosion paints and coatings containing nanoclays and a process for the production thereof allowing the limitations of the solutions according to known technology to be eliminated and previously described. technical results to be obtained A further object of the invention is that said formulation and process can be carried out at substantially reduced, both production and operating, costs.

Not last object of the invention is to propose a formulation and a process substantially simple, safe and reliable.

It is therefore a first specific object of the present invention a formulation for anticorrosion paints and coatings, based on epoxy, polyurethane, acrylic, alkylic, polyester and mixtures thereof, dissolved in organic or inorganic solvents, and comprising a multitude of nanoparticles mostly bi-dimensionally developed, with a few hundred and about one nanometer as to lateral dimensions and thickness, respectively, wherein the viscosity of the formulation is lower than 55000 mPa·s and preferably is lower than 40000 mPa·s.

In particular, according to the invention, the amount of said nanoparticles is lower than 2% by weight, based on total weight of the formulation, preferably is lower than 1% by weight, based on total weight of the formulation and most preferably is equal to 0.5% by weight, based on total weight of the formulation.

Particularly, according to the invention, said nanoparticles consist of materials containing ions available for ion exchange reactions, previously treated by ion exchange reaction with ions of long chain molecules, preferably of at least 16 carbon in order to achieve both: good intercalation of the Na+ nanoparticles and physical compatibility with di-glycidic ether of bis-phenol A matrix.

Always according to the invention, preferably said nanoparticles consist of silico-aluminate based materials, still more preferably montmorillonite.

Moreover, again according to the present invention, said ions of long chain molecules are obtained by protonising amines or other compounds compatible with other formulation components.

Further it is another specific object of the present invention a concentrated formulation for anticorrosion paints and coatings, based on epoxy, polyurethane, acrylic, alkylic, polyester resins and mixtures thereof, comprising a multitude of nanoparticles mostly bi-dimensionally developed, with a few hundred and about one nanometer, respectively, as to lateral dimensions and thickness, wherein after organic or inorganic solvent addition, the viscosity of the formulation is lower than 55000 mPa·s.

The invention now will be described by an illustrative, but not limitative way, particularly with reference to preferred embodiments and some illustrative examples.

According to the present invention, the platelets the formulation is made of are chemically treated in order to facilitate their orientation according to parallel direction of substrate the paint is applied on, thus increasing the platelets intermolecular forces. Moreover, the viscosity is controlled in order not to reach values preventing the platelets to move easily within the matrix consisting of polymeric paint, that is to align parallel to the metallic substrate (and therefore to offer as high as possible corrosion protection) as a result of the mechanical action carried out by devices used to spread the paint layer on the substrate. Further, in order to obtain low enough viscosities it is possible to add solvents to the paint (that are evaporated during drying) or reduce the solid content of the epoxy (like: calcium carbonate, metal oxides and other solids that are used in conventional paints).

EXAMPLE 1

Nanoclay Preliminary Treatment 50 g of Cloisite Na nanoclays (NC-Na), CAS N. 1318-93-0; 95 Meq/100 g, from Southern Clay Products, have been dispersed in 1500 ml of water at room temp. for 30 minutes and the resulting dispersion then has been heated at 85° C. and hold standing for 2 hours.

Apart a second solution, obtained by dissolving in 1300 ml of water, at temperature of 85° C., 19 g of octadecylamine (ODA), $C_{18}H_{39}N$, CAS N. 124-30-1, FW=269.51, from Fluka, cat N. 74752, has been prepared. Then hydrochloric acid (HCl) at 37% has been added up to pH 4.5, FW=36.5, and the solution stirred for 0.3 hours.

Then this solution has been added to the water nanoclay dispersion by mixing at 85° C. for 1 hour, subsequently allowing to cool.

In these conditions, a white colour precipitate has been formed, then separated from clarified liquid and successively washed, firstly with ethanol and then, for three times, with water.

Solid precipitate then has been collected and dried by heating at 80° C. for 15 hours and successively at 110° C. for 2 hours.

Dried precipitate consisting of platelet shaped Cloisite Na functionalised nanoclays is ready to be added to paints.

The principle of nanoclays treatment is to allow Na+ ion exchange (or other ion occurring within the nanoclays to be treated) with a long chain containing ion to be carried out. In this way the distance among the platelets forming the structure of ceramic nanoclays is increased, thus facilitating the de-lamination of the nanoclays resulting in single nanoclays (1 nm thick).

As a long chain containing ion can be used an amine, protonised with a such acid amount to allow the protonization to be carried out, that is, an ammonium ion which is exchanged with Na+ ion (specifically for example 1 octadecylamine is protonised with hydrochloric acid).

When the protonised amine solution is added to the water dispersion of ceramic nanoclays the ion exchange occurs. Resulting precipitate consist of ODA (which is hydrophobic) treated nanoclays.

EXAMPLE 2

Preparation of a Priming Formulation (Primer) Containing Functionalised Nanoclays Nanoclays obtained according to example 1 have been added to an epoxy priming formulation (primer), depending on various compositions as reported in table 1 and mixed until an uniform dispersion has been obtained.

Various primer obtained compositions have been individually applied to identical metallic substrates, then analyzed, with the results reported in table 1.

TABLE 1

| % NC | Viscosity mPaS | Thickness μm | No. of bubbles | Resistance Ω cm² |
|---|---|---|---|---|
| 0 | 27000 | 150 | 4 | $9 \times 10^7$ |
| 0.5 | 32000 | 140 | 0 | $8 \times 10^9$ |
| 1.0 | 37100 | 140 | 2 | $5 \times 10^9$ |
| 2.0 | 52400 | 142 | 2 | $1 \times 10^9$ |

Particularly, in table 1, % NC shows the nanoclay percentage on the total of the formulation, viscosity is rotational viscosity at 10 rpm, measured according to ASTM D2196, bubble number has been measured after 700 hours of exposure to saline sprays (salt spray test: ASTM B117) and resistance has been measured after 700 hours of exposure and thickness of 80 μm according to Electrochemical Impedence Spectroscopy: ISO 16773-3:2009.

EXAMPLE 3

Preparation of a Painting Formulation Containing Functionalised Nanoclays

Nanoclays obtained according to example 1 have been added to an epoxy painting formulation, depending on the various compositions as reported in table 2, and mixed until an uniform dispersion has been obtained.

Various paint obtained compositions have been individually applied to identical metallic substrates, then analysed, with the results reported in table 1.

TABLE 2

| % NC | Viscosity mPaS | Thickness μm | No. of bubbles | Resistance Ω cm² |
|---|---|---|---|---|
| 0 | 26600 | 160 | 20 | $2 \times 10^{10}$ |
| 0.5 | 39000 | 130 | 0 | $1 \times 10^{12}$ |
| 1.0 | 51400 | 135 | 3 | $8 \times 10^{11}$ |
| 2.0 | 85700 | 130 | 5 | $1 \times 10^{11}$ |

Particularly, in table 2, % NC shows the nanoclay percentage on the total of the formulation, the viscosity is rotational viscosity at 10 rpm, measured according to ASTM D2196, the bubble number has been measured after 700 hours of exposure to saline sprays (salt spray test: ASTM B117) and resistance has been measured after 700 hours of exposure and thickness of 150 μm according to Electrochemical Impedence Spectroscopy: ISO 16773-3:2009.

EXAMPLE 4

Comparative Evaluation of Detachment Strength of Painting Formulation Containing Functionalised Nanoclays Nanoclays obtained according to example 1, and other closite nanoclays (30 B closite) not subjected to the same treatment, have been added to an epoxy painting formulation, according to various compositions as reported in table 3 (the first line of the table referring to a not nanoclay added formulation); individually applied to identical metallic substrates (to form a low thickness coating), and successively subjected to adhesion tests, by means of pull-off analysis, with results as reported in table 3.

Pull-Off test is a direct method, according to EN ISO 4624, aiming to check the quality of a coating and it is carried out by a destructive test allowing the detachment strength of the paint coating layer to be evaluated. For each formulation two adhesion tests in dry and one in wet conditions have been carried out.

TABLE 3

|  | Dry adhesion (MPa) | | | Wet adhesion |
| --- | --- | --- | --- | --- |
|  | Value 1 | Value 2 | Average | (MPa) |
| Without nanoclays | 17.0 | 17.0 | 17.0 | 12.0 |
| 1% Example 1 | 13.4 | 15.0 | 14.2 | 16.4 |
| 1% Closite 30 B | 5.2 | 6.0 | 5.6 | 3.6 |
| 2% Example 1 | 15.0 | 17.0 | 16.0 | 19.0 |
| 2% Closite 30 B | 5.0 | 5.0 | 5.0 | 4.8 |

The examples allow to verify that the new formulation as described in the present invention inhibits the humidity and oxygen permeation through the protective coatings on the metallic surface, so as to minimize the corrosion effects. Such inhibition occurs as a result from the ordered and parallel orientation of surface extended inorganic nanoclays obtained by means of the treatment according to example 1.

Moreover, the examples show higher effectiveness of functionalised nanoclays added anticorrosion formulations according to the present invention than not functionalised nanoclays added formulations.

With reference to the amount of nanoclays added to the formulation for anticorrosion paints and coatings according to the present invention, the amount of nanoclays to be used must be such not to result in an undesired viscosity increase. In order the viscosity objectives to be reached, the paint formulation can conveniently be diluted with not reacting reagents (organic or water based) reducing the viscosity level and evaporating after the coating curing.

The present invention has been described by an illustrative, but not limitative way, according to preferred embodiments thereof, but it is to be understood that variations and/or modifications could be carried out by those skilled in the art without departing from the scope thereof, as defined in enclosed claims.

What is claimed is:

1. Anticorrosion paint or printer formulation comprising paint solids, an epoxy, polyurethane, acrylic, alkydic or polyester resin or mixture thereof and greater than 0% and less than 1% by weight platelet shaped nanoparticles, based on the total weight of the formulation, wherein octadecylammonium ions are attached to a surface of the nanoparticles, and wherein the rotational viscosity of the formulation at 10 rpm is above 26600 mPa·s and lower than 55000 mPa·s.

2. The anticorrosion paint or primer formulation according to claim 1, wherein the viscosity of the formulation is lower than 40000 mPa·s.

3. The anticorrosion paint or primer formulation according to claim 1 wherein said nanoparticles consist of silica-aluminate based materials.

4. The anticorrosion paint or primer formulation according to claim 1, wherein said nanoparticles consist of montmorillonite.

5. The anticorrosion paint or primer formulation according to claim 1, wherein said nanoparticles consist of bentonite.

6. The anticorrosion paint or primer formulation according to claim 1, wherein the formulation includes a bisphenol A epoxy base.

7. Method for preparing an anticorrosion paint or primer formulation comprising:
   a) treating platelet-shaped nanoparticles by ion exchange reaction to obtain nanoparticles comprising at least 16 carbon atom hydrophobic chains attached to a surface of said nanoparticles wherein octadecylammonium ions are attached to a surface of the nanoparticles; and
   b) adding less than 1% by weight of said obtained nanoparticles based on the total weight of the formulation, to a paint or primer base comprising paint solids and an epoxy, polyurethane, acrylic, alkydic or polyester resin or mixture thereof, and thereby obtaining an anticorrosion paint or primer formulation having a viscosity above 26600 mPa s and lower than 55000 mPa·s at 10 rpm.

8. The method according to claim 7 wherein said nanoparticles consist of silico-aluminate based materials.

9. The method according to claim 7, wherein said nanoparticles consist of montmorillonite.

10. The method according to claim 7, wherein said nanoparticles consist of bentonite.

* * * * *